United States Patent [19]
Brown

[11] 3,904,926
[45] Sept. 9, 1975

[54] CONVERSION OF PLUG-IN OSCILLOSCOPE TO RADAR B-SCOPE

[75] Inventor: Bruce J. Brown, Alexandria, Va.

[73] Assignee: The United States of America as represented by the Secretary of the Navy, Washington, D.C.

[22] Filed: Jan. 17, 1972

[21] Appl. No.: 218,383

[52] U.S. Cl. .................................. 315/378; 343/5
[51] Int. Cl.[2] ....................................... H01J 29/78
[58] Field of Search .................. 315/23, 378; 343/5

[56] References Cited
UNITED STATES PATENTS

| | | | |
|---|---|---|---|
| 2,830,227 | 4/1958 | Hasbrook | 315/23 X |
| 3,188,386 | 6/1965 | Byatt | 315/23 X |
| 3,317,910 | 5/1967 | Hausz | 343/16 M |
| 3,684,915 | 8/1972 | Gangawere | 315/23 |

OTHER PUBLICATIONS
*Radar Handbook*, Skolnik, McGraw–Hill Book Co., 1970, p. 6–15, 6–24, 6–25.

Primary Examiner—Samuel Feinberg
Assistant Examiner—P. A. Nelson
Attorney, Agent, or Firm—R. S. Sciascia; Arthur L. Branning

[57] ABSTRACT

Method and means for converting a commercial-plug-in oscilloscope to a radar B-scope display unit. Firstly, the CRT electron-beam scan is changed from a horizontal to a vertical sweep by placing the time-base generator in the vertical side and the amplifier in the horizontal side. The retrace blanking signal is also changed from the horizontal to the vertical side via a switch. Secondly, the display is converted to intensity modulation through a wide-bandwidth, high-gain amplifier. Thirdly, the standard CRT is replaced by one having a long-persistence screen. Fourthly, a range-mark pulse generator is incorporated in the unit.

5 Claims, 6 Drawing Figures

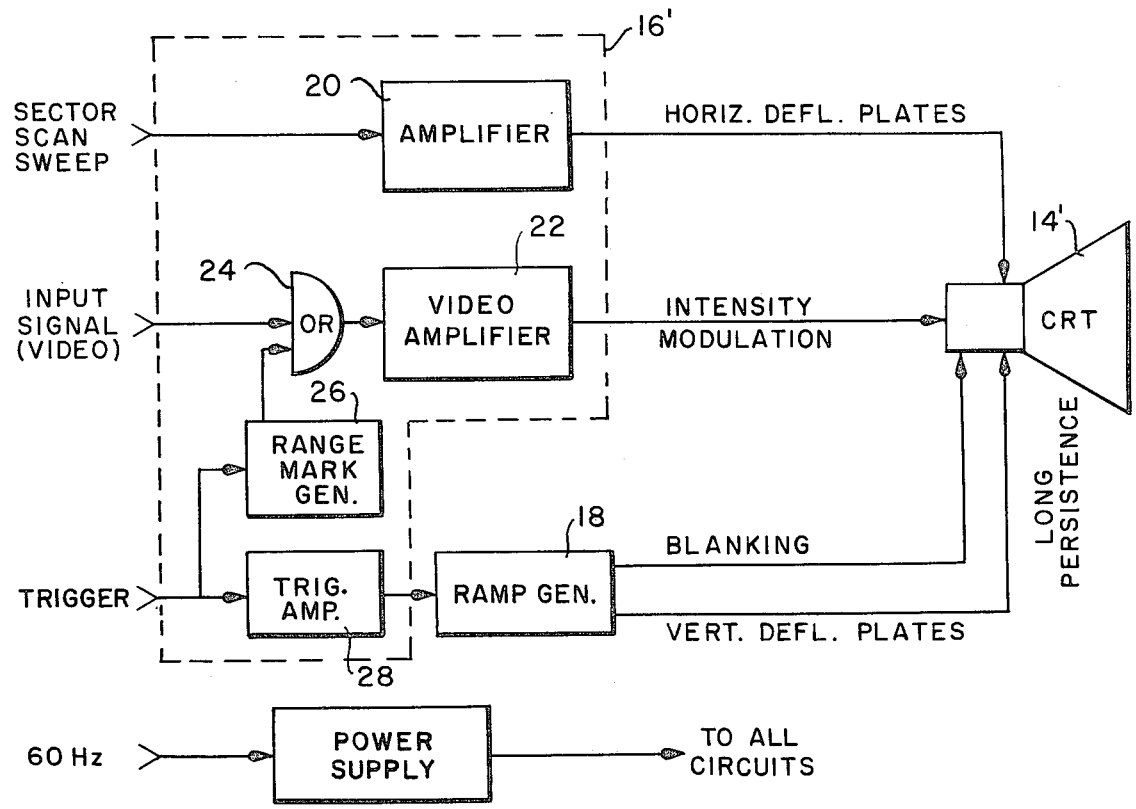
FIG. 3.
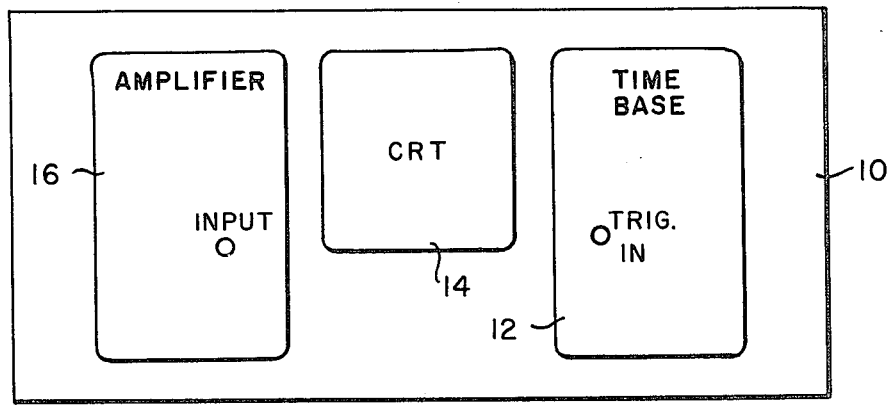
FIG. 4. (ORIGINAL LOCATIONS OF PLUG-IN UNITS)

CONVERSION OF PLUG-IN OSCILLOSCOPE TO RADAR B-SCOPE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to radar B-scopes and especially to a unit for converting an ordinary commercial plug-in type of oscilloscope to a radar-video B-scope.

One type of display for radar systems utilizes the range and azimuth characteristics of returning echo signals. The information can be displayed on a PPI-type display in which the range sweep goes from the center of a circle to the outer periphery, each succeeding sweep advancing by a fraction of a degree until 360° is swept out, or the information can be displayed on a B-scope display which is basically a rectangular-coordinate display where the vertical (Y) axis indicates range and the horizontal (X) axis indicates azimuth.

A B-scope display unit for a radar system costs at least $7,000; for example, the HRB-Singer Model DC 101, 10 inch Scope is priced at $15,000. Most radar stations that utilize B-scopes also have oscilloscopes for equipment maintenance or signal monitoring purposes. If the oscilloscope could also be used as a B-scope display for the radar video signals, there would be a large saving in expense and a saving in space since the customary B-scope display unit could be eliminated.

SUMMARY OF THE INVENTION

Accordingly, the present invention is a plug-in unit for a commercial dual plug-in type oscilloscope which converts it into a radar-video B-scope display unit. Four changes are made, namely:
1. Conversion of the cathode ray tube's (CRT) electron beam scan from horizontal to vertical sweep;
2. Conversion of the display to an intensity-modulated display;
3. Conversion of the CRT screen to a long-persistence screen; and, if desired,
4. Provision of a 10-nautical-mile range-marker grid.

OBJECTS

An object of the present invention is to replace the conventional radar B-scope display unit with a converted commercial-type plug-in oscilloscope.

Another object is to save expense and space by utilizing a converted commercial plug-in oscilloscope in place of a conventional B-scope display unit with a radar system.

Other objects, advantages and novel features of the invention will become apparent from the following detailed description of the invention when considered in conjunction with the accompanying drawings wherein:

BRIEF DESCRIPTION OF THE DRAWINGS

FIG. 3 is a block diagram of a B-scope utilizing the invention;

FIG. 4 is an illustration showing the front of the oscilloscope which was employed;

DETAILED DESCRIPTION OF THE INVENTION

Figure 1:
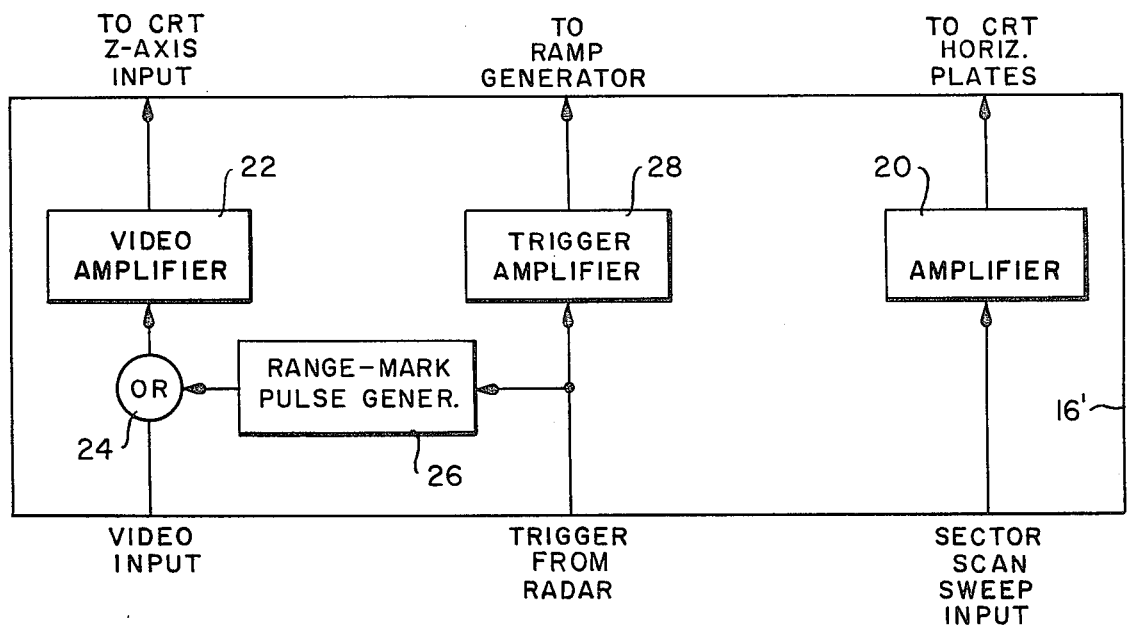
FIG. 1 is a block diagram of an embodiment of the invention.
Figure 2:
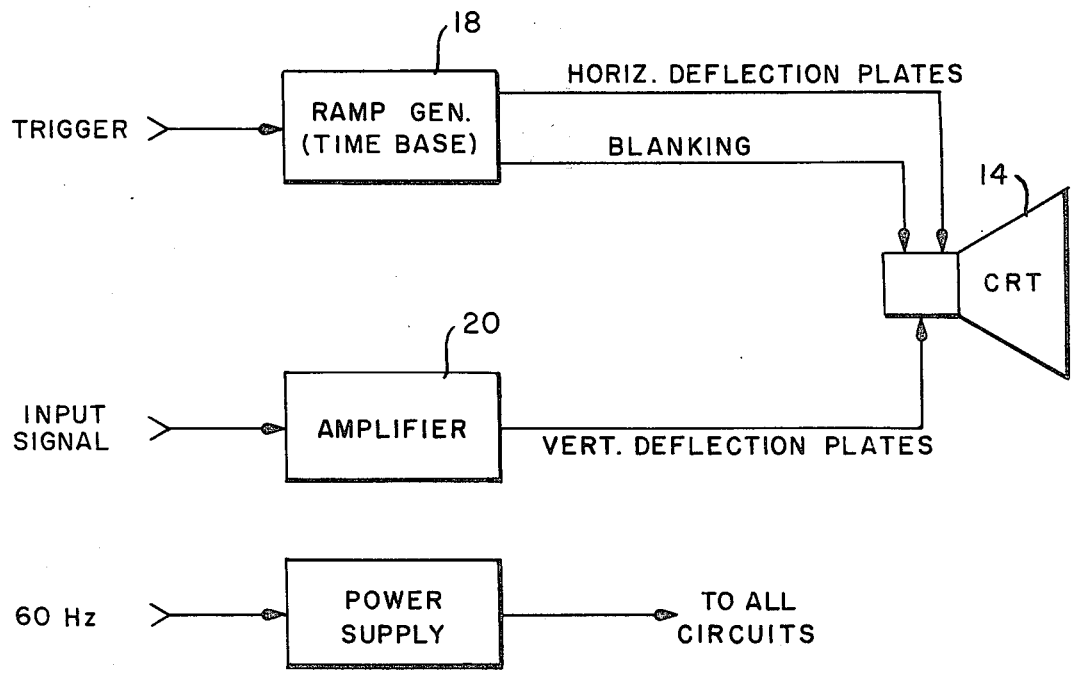
FIG. 2 is a block diagram of an oscilloscope.
Figure 5:
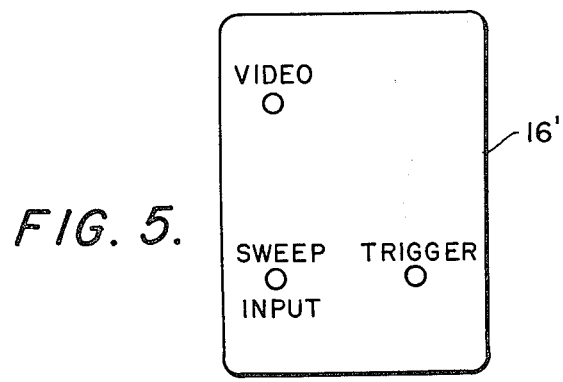
FIG. 5 is an illustration showing the front of the amplifier plug-in unit of the oscilloscope after modification.

A typical type of oscilloscope which can be utilized with the present invention is exemplified by the Tektronix Model RM561A dual plug-in oscilloscope 10, for example. As indicated in FIG. 4, this "scope" has a time-base plug-in unit 12, a cathode ray tube (CRT) 14 and an amplifier plug-in unit 16. The time-base unit comprises a ramp generator 18 (see FIG. 2.) to which a trigger pulse is fed as an input, for example, from a radar set whose waveforms or whose output signals are to be examined. The amplifier plug-in unit 16 has the video signal of the radar as its input, this signal being fed to the Model 2A60 amplifier 20 of the scope 10.

The oscilloscope 10 has a horizontal sweep (time base) furnished by the ramp generator 18 which also furnishes blanking pulses for blanking out the retrace lines. The input signal is fed to the vertical deflection plates. A B-scope, however, has a range v. azimuth type display, the range being the vertical coordinate and the azimuth being the horizontal coordinate. To convert the oscilloscope 10 to a B-scope, the amplifier unit 16 (See FIG. 3) and the time-base unit 12 are switched in position so that the output of the amplifier 20 now is applied to the horizontal deflection plates of the CRT. The time-base output of the ramp generator 18 is now applied to the vertical deflection plates and the sector-scan sweep voltage derived from the antenna unit of the radar set is applied to the horizontal deflection plates of the CRT 14' through the amplifier 20.

A video amplifier 22, an OR gate 24, a range-mark generator 26 and a trigger amplifier 28 are added to the amplifier plug-in unit 16'. The trigger from the radar set is fed to the ramp generator 18 in the time-base unit 12 through a trigger amplifier 28 which may, or may not be necessary, depending on the amplitude of the trigger pulse. The trigger input is also fed to a range-mark generator 26 which provides range-mark pulses for marking 10-nautical-mile ranges on the display.

The range-mark pulses are fed to an OR gate 24 which also receives the video output of the radar set as a second input. The OR gate output is applied to the video amplifier 22 as an input and the output of the video amplifier 22 is applied to the cathode, for example, of the CRT 14' to intensity-modulate the CRT.

The conventional CRT used in the Tektronix oscilloscope (the P 31) is replaced by a long-persistence CRT, such as the P7 type.

Figure 6:
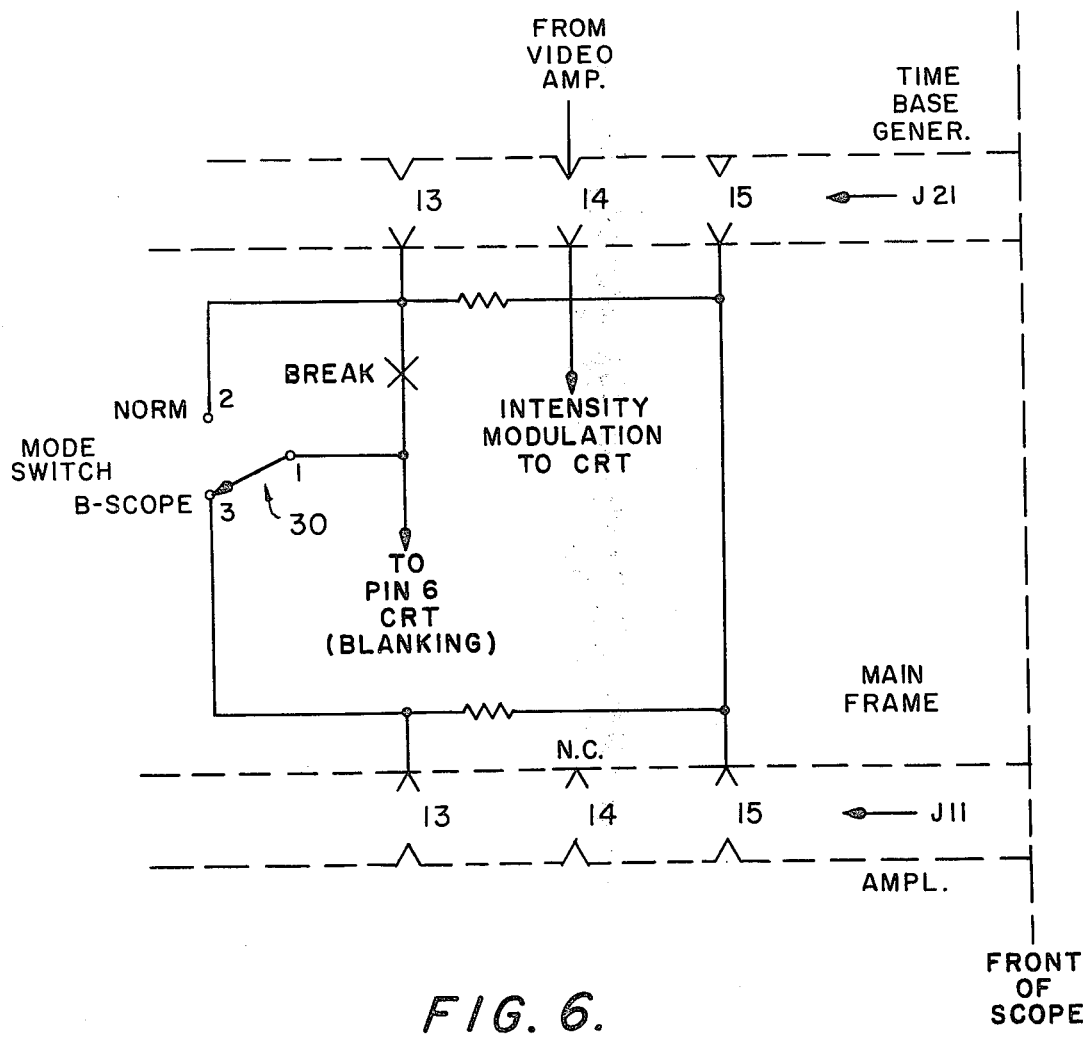
FIG. 6 is a schematic diagram showing the circuit change which must be made for the blanking pulse.

The circuit changes which must be made in the particular oscilloscope which was used (Tektronix Model RM561A) are minimal. There are two multipin connectors (J 21 on the right side of the frame and J 11 on the left side, right and left being taken as seen when the unit is viewed from the front panel. The blanking wire on the original scope extended from pin 13 of J 21 to pin 6 of the CRT. A single-pole double-throw switch 30 (FIG. 6) is affixed to the frame of the oscilloscope unit and wired as shown in FIG. 6 so that blanking pulses can be connected from pin 13 of J 21 or alternatively from pin 13 of J 11 to pin 6 of the CRT according to whether the ramp generator is in its original or its B-scope position. Of course, after the mode switch 30 is wired, the original wire connection from pin 13 of J 21 to the CRT is broken.

Also, a connection is made from pin 14 on the main frame to the cathode of the CRT to intensity-modulate the CRT with the output of the video amplifier 22. The output of the video amplifier 22, which is built on the frame 16 of the original amplifier unit, is wired to pin 14 of the connector J 21.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. The method of converting a dual-plug-in-type of oscilloscope to a device usable either as an oscilloscope or a radar B-Scope, said dual-plug-in-type of oscilloscope having a cathode ray tube (CRT) with a blanking electrode, an amplifier plug-in (P-I) unit for amplifying the input signal and applying it to the vertical deflection means of said CRT, a time-base-generator plug-in (P-I) unit synchronized by an input trigger pulse, a first plug-in connector between the amplifier and CRT frames and a second plug-in connector between the time-base generator and CRT frames, said CRT, amplifier P-I unit and time-base-P-I unit being on individual frames, the output of the time-base generator being applied to the horizontal deflection means of said CRT, said method comprising the steps of:

replacing the CRT with one having a long-persistence screen;

interchanging said amplifier and time-base generator plug-in units;

adding a video amplifier to the frame of said amplifier P-I unit, said video amplifier being wired to receive the radar video output as an input signal;

including switching means for routing the blanking pulses from said time-base-generator P-I unit to said blanking electrode when said time-base generator unit is in either its original or its B-scope position; and connecting an electrode of the CRT which is suitable for intensity modulation to receive the output of said video amplifier through said second connector.

2. A method as set forth in claim 1, including the step of:

rewiring said blanking electrode of said CRT by breaking the wire connecting the blanking electrode on said CRT to the second connector on the CRT frame side, and adding a single-pole, double-throw switch to the CRT frame, said switch acting in one position to connect the blanking electrode of the CRT to the pin in said second connector which was originally connected to said blanking electrode and acting, in its other position, to connect the corresponding pin in said first connector to said blanking electrode.

3. A method as set forth in claim 1, wherein:

said connecting of the intensity-modulation electrode of said CRT is accomplished by connecting a wire from a no-connection pin on the CRT-frame side of said second connector to an electrode in said CRT which is suitable for intensity modulation and connecting the output of said video amplifier to the corresponding pin on the time-base-generator-frame side of said second connector.

4. A method as set forth in claim 1, further including the step of:

providing range marks for the CRT display.

5. A method as set forth in claim 1, wherein said range marks are provided by range-mark means comprising a range-mark generator and an OR gate, said OR gate receiving as inputs the video signal from a radar set and the output of the range-mark generator, the output of the OR gate being fed to the video amplifier, and the input to the range-mark generator being a trigger signal from the radar set.

* * * * *